United States Patent [19]

de Saint Blancard et al.

[11] Patent Number: 5,296,924

[45] Date of Patent: Mar. 22, 1994

[54] PROCESS FOR DETECTION OF OBSTACLES PRESENT, IN PARTICULAR, IN FRONT OF AN AUTOMOTIVE VEHICLE

[75] Inventors: Marie de Saint Blancard, Rueil Malmaison; Joseph Alizon, Orcet; Jean Gallice, Chamalieres, all of France

[73] Assignees: Automobiles Peugeot, Paris; Automobiles Citroen, Neuilly sur Seine, both of France

[21] Appl. No.: 879,281

[22] Filed: May 7, 1992

[30] Foreign Application Priority Data

Jul. 5, 1991 [FR] France ............................... 91 05628

[51] Int. Cl.$^5$ ............................................. H04N 7/18
[52] U.S. Cl. ................................... 348/118; 348/142
[58] Field of Search ................... 358/93, 103, 107; H04N 7/18

[56] References Cited

U.S. PATENT DOCUMENTS

| | | | |
|---|---|---|---|
| 3,781,111 | 12/1973 | Fletcher et al. | 356/5 |
| 3,897,150 | 7/1975 | Bridges | 358/107 |
| 4,477,184 | 10/1984 | Endo | 356/141 |
| 5,005,085 | 4/1991 | Spies | 358/125 |
| 5,109,345 | 4/1992 | Dabney | 358/103 |
| 5,197,562 | 3/1993 | Kakinami | 358/103 |

*Primary Examiner*—Howard W. Britton
*Attorney, Agent, or Firm*—Burns, Doane, Swecker & Mathis

[57] ABSTRACT

The present invention concerns a process and an apparatus for the detection of obstacles. The apparatus includes a video camera (2) for the viewing of the scene, a range apparatus (3) to measure the distance d of obstacles, the range apparatus (3) being coupled to an assembly (6, 7) for the deflection of the pulsed radiation emitted by the telemetric apparatus (3), and signal conditioner (16) designed to produce, from the synchronization signals of the field (ST) and the line (SL) of a video signal of the camera (2), signals making it possible to cause, in the same uneven field, the emission of pulsed radiation and the horizontal scanning movement of a mirror. The conditioner (16) further makes possible the synchronous recording, on a standard video tape recorder, conventional video signals and digitally coded range signals.

23 Claims, 5 Drawing Sheets

PROCESS FOR DETECTION OF OBSTACLES PRESENT, IN PARTICULAR, IN FRONT OF AN AUTOMOTIVE VEHICLE

BACKGROUND OF THE INVENTION

1) Field of the Invention

The present invention concerns a process for the detection of obstacles and, in particular, the detection of obstacles in front of an automotive vehicle, together with an apparatus to carry out the process.

2) Discussion of Related Art

Processes for detecting obstacles with a video camera on board vehicles and producing a video image of the scene in front of the vehicle, are known.

However, in order to ascertain the position of a point within the space of the scene with a single camera, it is necessary to introduce models of the environment for comparison. With such a process it is not possible to determine the distances of potentially dangerous obstacles.

Another process for the detection of obstacles uses two or more video cameras thus permitting the acquisition of more complete information on the scene facing the vehicle, in a zone relatively close to the vehicle up to about 20 meters. However, this process does not make it possible to determine precisely the distances of obstacles, due to the fact that the error in the distance detection, in the viewing direction, is proportional to the square of the distance.

It is an object of the present invention to eliminate the disadvantages of the known processes mentioned above by providing a process for the detection of obstacles present in front of an automotive vehicle, the process making it possible to determine with precision the position of a point in space relative to a reference associated with the vehicle and to allocate different points in space to an obstacle and to ascertain their position in a zone extending, for example, from 5 to 85 meters.

For this, the process for the detection of obstacles present in front of, in particular, an automotive vehicle, includes providing, by means of a video camera on board the vehicle, a composite video signal representative of a video image of a scene in front of the vehicle, measuring the distances of the obstacles in the scene relative to the vehicle by means of a ranging apparatus also present on board the vehicle, the pulsed incident waves of which sweep the scene by successive horizontal telemetric lines, and synchronizing the pulsed emission of the incident waves and their scan by scanning field synchronization signals and the line signals extracted from the video signal.

According to a characteristic of the invention, the telemetric data of the telemetric apparatus, which are representative of the measured distances of the obstacles and the coordinates of the points of impact of the incident pulsed waves, are entered in or overlaid on the video image in a synchronized manner.

Advantageously, the pulsed emission of the aforementioned incident waves is effected during the uneven field of each video image and the telemetric data are entered during the following even field of the video image.

According to another characteristic of the invention, the pulsed emission of the incident waves is carried out at a first, predetermined clock frequency, obtained from the frequency of the line synchronization signal. At least the telemetric data relative to the distances of the impact points measured are digitalized during the uneven field of the emission of the pulsed waves at a sampling frequency equal to the first clock frequency. Further, the digitalized telemetric data are stored during said uneven field with a combination of the first clock frequency and a second clock frequency. In order to avoid data conflicts, the inscription of the digitalized data occurs during the following even field onto a certain number of consecutive video lines of the even field at a third clock frequency obtained from the frequency of the line synchronization frequency, said third clock frequency being higher than the first and second clock frequency.

The aforementioned pulsed waves horizontally scan a telemetric line of the scene during an uneven frame at the first clock frequency. Then, the beam of pulsed waves is deflected vertically and horizontally during the even field according to an initial scanning position of a following telemetric line, the scan being effected during the uneven field of a following video image.

Preferably, only the values in the coordinates x, y of the initial position of each scan of a range line are digitalized and placed into memory at the end of the even fields and the positions of the different impact points of consecutive pulsed waves are automatically reconstituted from a pre-established scanning curve, preferably a ramp.

According to another characteristic of the invention, a signal of the selection of the number of the aforecited video lines upon which the range data are inscribed is produced at the onset of each even field, and shortly after the selection signal, a signal of the validation of the entry of the range data on the video lines selected is produced.

Advantageously, the aforementioned video lines upon which the range data are inscribed are located in the upper part of the video image after several forced black lines and a forced white general starting line, and they comprise a line for the identification number of the video image and the lines proper for the inscription of the range data.

The range data and the video image signal are recorded on a recording device, such as a video tape recorder, or else the range data and the video image are processed in real time.

The points of impact of the pulsed incident waves are disposed in zigzag by the temporary dislocation of one range line in two at the onset of each horizontal scan.

The invention also proposes an apparatus for the detection of obstacles to carry out the above-described process.

The apparatus according to the invention comprises a video camera on board of the vehicle for viewing a scene in front of the vehicle, a range apparatus to measure the distance of the obstacles in the scene relative to the vehicle, an assembly for the deflection of the pulsed radiation emitted by the range apparatus with at least one controlled mobile deflection mirror to cause the radiation to carry out a scanning movement of successive horizontal telemetric lines on the scene, and a signal conditioner to produce, from the synchronization signals of the line pattern and the video signal of the camera, signals making it possible to command, in the same uneven field, the emission of pulsed radiation and the horizontal scanning movement of the mirror and the production of signals to inscribe, during the following even field onto successive lines of the video image, the range data relative to the coordinates of the points of impact of the pulsed radiation on the obstacles of the scene and the distance measured of each impact point relative to the vehicle.

Preferably, the apparatus comprises two mobile deflection mirrors for horizontal and vertical scanning. The displacement of the horizontal deflection mirror scans along a range line. A loop circuit locked in phase and a certain number of dividing circuits controlled by the line synchronization signals produce a first clock frequency to command the emission of pulsed radiation and the digitalization of the range data, a second clock frequency, preferably at a frequency double that of the first clock frequency places the range data into a memory and a third clock frequency causes the inscription of the range data onto the video image.

The conditioner includes electronic circuits capable of producing a first signal which appears prior to the onset of an uneven field and ending with said uneven field to define a window permitting the measurement of data relative to the initial positions of the vertical and horizontal deflection mirrors prior to the scanning of a range line, i.e., the horizontal scanning, the emission of pulsed radiation and the incrementation of the vertical scanning mirror to a subsequent range line, with a second signal emitted after the start of each pair of frames making possible the selection of the number of video lines onto which the range data are inscribed, and a third signal emitted shortly after the appearance of the second signal, to validate the inscription of the range data onto the video lines selected.

The conditioner further contains a locking or clamping stage making it possible to produce so-called clamping pulses for the correct alignment of the video and range signals.

Advantageously, the apparatus comprises decoupling means, such as a cover in the form of a plate, for decoupling the emission or the reception of the pulsed radiation to the level of the aforementioned mirrors.

Preferably, the above-mentioned range apparatus is of the laser type.

The apparatus may further comprise a computer on board the vehicle for processing the range and video data and for producing signals intended to control the safety devices of the vehicle.

DETAILED DESCRIPTION OF THE DRAWINGS

The invention will be better understood and become more apparent, together with other objects, characteristics, details and advantages, from the following description with reference to the schematic drawings, given solely as examples illustrating a mode of an embodiment of the invention and wherein:

FIG. 8 represents command and window signals produced by the signal conditioner of FIG. 5;

DETAILED DESCRIPTION OF THE INVENTION

As shown by the figures, the apparatus 1 for the detection of obstacles in front of an automotive vehicle (not shown) comprises a video camera 2 on board the vehicle to provide a composite video signal that is representative of the video image of a scene passing in front of the vehicle, a range apparatus 3 also on board the vehicle to measure the distances of the obstacles in the scene relative to the vehicle by the emission and reception of pulsed radiation, a signal conditioner 4, the functions whereof are explained hereinbelow and an assembly 5 of mirrors respectively for the horizontal 6 and vertical 7 deflection of the beam or radiation of the range apparatus 3, controlled by appropriate signals originating in the signal conditioner 4.

The camera 2 is of the conventional CCD type in black and white according to European Standard CCIR, such as those bearing the reference IVC 500 of the French company I2S France. The camera 2 is equipped with an objective lens with a focal distance of 16 mm, making possible an observation essentially equivalent to the field of human vision. In the present case, the video image of the camera 2 is digitalized so as to obtain an image of luminance of 512×512 image elements or pixels, preferably coded on 8 bits.

The range apparatus 3 is capable of measuring distances without contacting the obstacles in front of the vehicle. Three ranging methods are used at the present time and they utilize hyperfrequencies, ultrasonics and luminous or infrared waves, depending on whether the corresponding telemetric devices operate in the visible or the infrared range. Within the present invention, laser type ranging is preferably provided, because it yields a very good spatial resolution, which is an important characteristic for the obtaining of a good range image.

The range apparatus 3 operates on the principle of flight time measurement, i.e., following the emission of a pulsed wave in the direction of a target, the time required by the wave to return to a receiver element of the range apparatus, after having impacted the target, the time being proportional to double the distance to be measured. As a range apparatus operating on this principle, the ranging device type LD 90-25S manufactured by the Austrian R1EGL company is used; it has the following characteristics:

| | |
|---|---|
| semiconductor laser: | As Ga diode, |
| wave length: | 905 nm, |
| duration of emission: | 35 ns, |
| peak power: | 15 W, |
| diameter of the laser | 25 mm, |

-continued

| | |
|---|---|
| beam at outlet: | |
| beam divergence: | 3.3 mrd (impact of 35 cm in diameter at a distance of 100 m), |
| measuring range: | 2 to 100 m, |
| precision: | '10 cm,' 0.1% of the distance measured, |
| safety: | Class 3B. |

Figure 2:
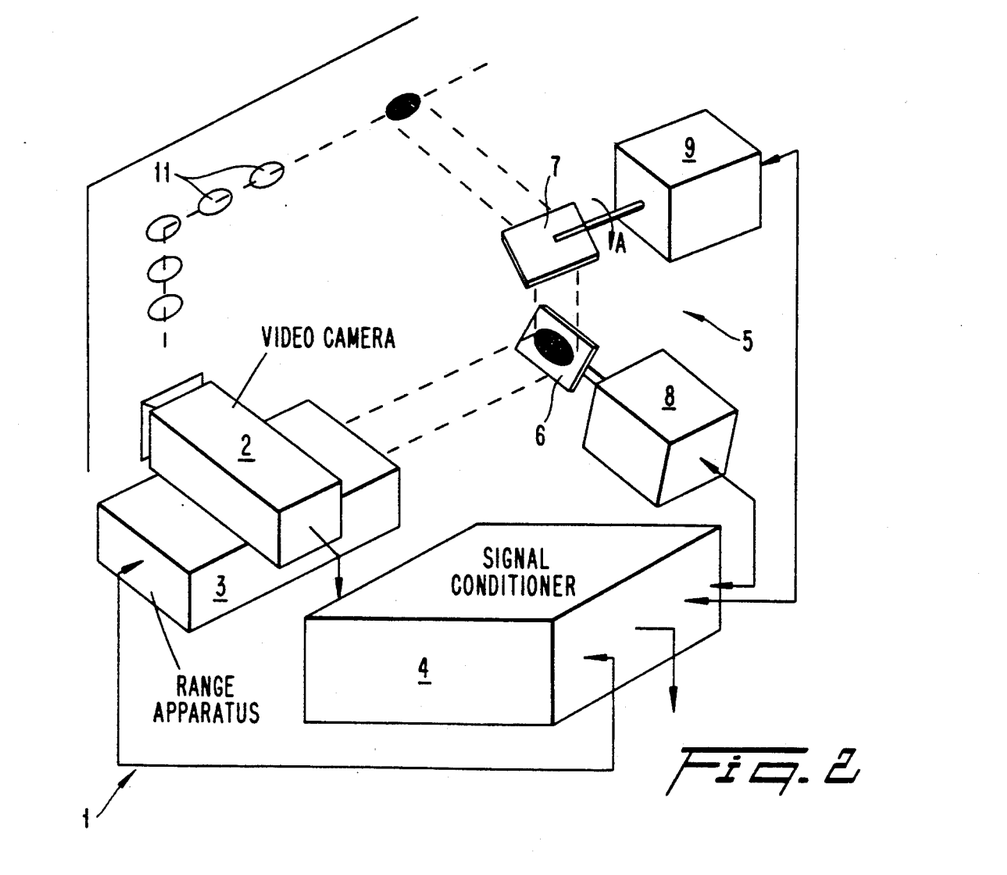
FIG. 2 is a schematic perspective view of the apparatus for the detection of obstacles according to the present invention.

The assembly 5 coupled with the range apparatus 3 makes it possible to obtain a range image synchronized with the video image of the camera of dimensions determined by the horizontal and vertical scanning of the scene in front of the vehicle by the beam or radiation issuing from the telemetric apparatus 3 by means of the mirrors 6 and 7 treated with aluminum and protected by silica. The mirrors 6, 7 are galvanometrically controlled by, for example, those marketed under the designation EXY 5067 V of the General Scanning Co. of the USA and two electronic modules 8, 9, for example of the type CX 660 of the same company, pilot the control of the angle of the deflection of the mirrors 6, 7 according a command voltage. The assembly consisting of the electronic modules and the galvanometric control is represented by the two blocks of FIG. 2 designated 8 and 9. By means of the galvanometric control and the aforementioned electronic controls, the laser beam may undergo a maximum deviation of $\pm 20°$, both in the vertical and the horizontal direction, with a response time of around 15 ms. Deflection by means of galvanometrically controlled mirrors has been chosen, because the amplitude of the deviations or deflections is entirely programmable and because they make possible the viewing of a particular point and the random viewing of the scene. This is especially advantageous if another vehicle is preceding the vehicle upon which the apparatus according to the invention is installed, the other vehicle representing a potentially dangerous obstacle.

The galvanometric control of the mirrors 6, 7 thus makes it feasible to readily obtain different formats of range images. In view of the characteristics imposed by the range apparatus 3 (maximum frequency of the laser strokes, the diameter of the laser beam requiring large mirrors), the deflection assembly 5 (response time of the mirrors 6, 7 as a function of their dimensions making possible the simultaneous emission-reception of the laser beam) and by the tape of a video tape recorder passing over a cassette in which range data may be inscribed on a video image, as explained hereinbelow, the range image obtained by the vertical and horizontal scanning of the laser beam is chosen so as to have a format forming a matrix of 10 range lines with 20 points per line. As specified below, a range line of 20 points is obtained during a frame of a video image of the camera 2, or within 20 ms for laser stroke frequencies of 1 KHz, with the following field of the same image being used to mix the range data into the video image. A range line of 20 points is thus obtained for every two frames and the complete range image of 10 lines is therefore obtained in 400 ms, a frequency of 2.5 Hz.

Assuming that the vehicle is traveling on a four lane highway, the dimension of the range image at 100 m from the vehicle is determined by the building specifications of the highway, which in the present case translates into a rolling width of 20 m at 100 m from the vehicle. Under these conditions, the angles of the horizontal scan x and vertical scan y are chosen so that, to cover at 100 m from the vehicle, a zone 10 with a width l of 20 m and a height h of about 5 m. To cover such a zone 10, the angular scanning values x and y are respectively 11° and 3°, which in practice corresponds to a zone located 100 m from the vehicle, with a width l=10 m and a height h=5.2 m.

Figures 3, 4:
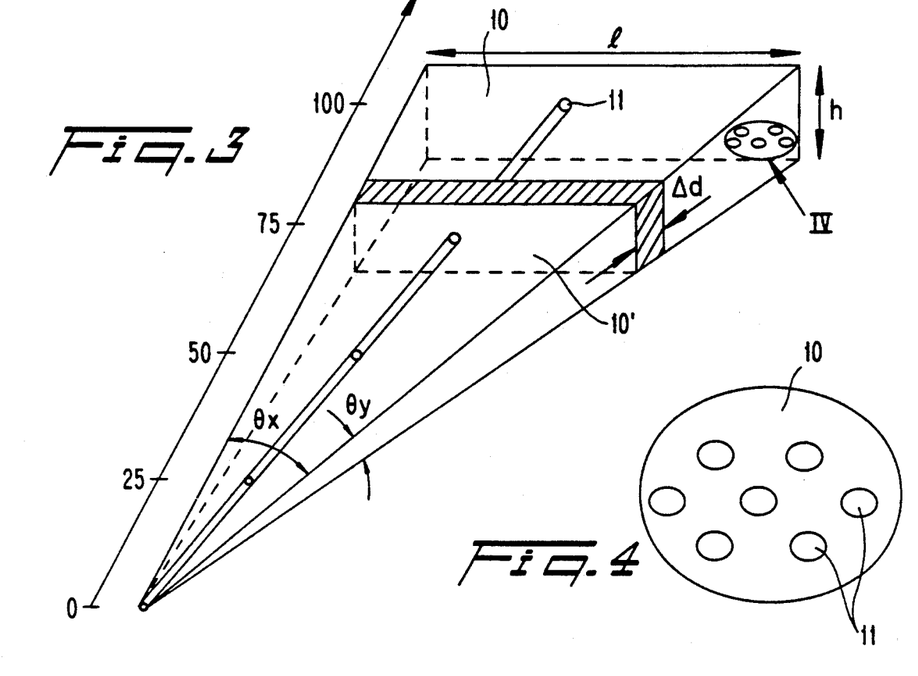
FIG. 3 shows sections Δd of range images obtained by the scanning of portions of space corresponding to a laser beam.
FIG. 4 is an enlarged view of the part circled at IV of FIG. 3.

FIG. 4 shows different points of impact 11 of the laser beam on a vertical plane containing the above-defined zone 10 of the range image. The impact points 11 are essentially circular and have a diameter of 35 mm for the values of x and y cited above. For these values of the scanning angle, the zone 10' covered by the laser beam to produce a range image located at about 80 m from the vehicle will have a width l=15.4 m and height h=4.2 m. In fact, these scanning angles correspond to a small coverage used for vehicles in front of the vehicle carrying the apparatus according to the invention at a distance of more than 50 m. For vehicles located at less than 50 m, it is preferable to carry out the horizontal and vertical scanning with angular values larger than those defined above. In actual practice, it was found to be advantageous to use in such cases a horizontal scanning value of x=20° and a vertical angular value of h=2.6 m. The choice between small angle scanning and large angle scanning may be effected by the driver manually or automatically from the values of the distances of the impact points measured by the range apparatus 3.

Figure 1:
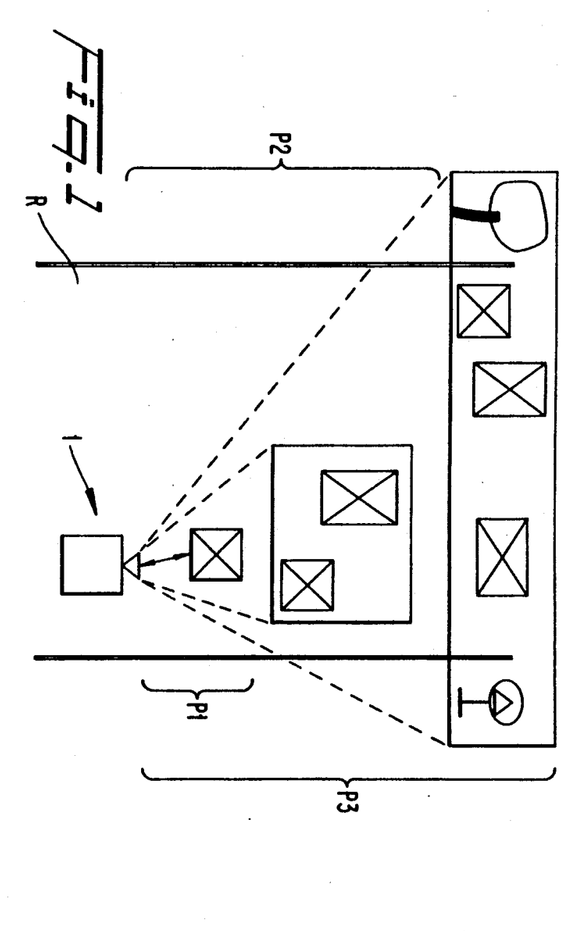
FIG. 1 shows schematically in a top elevation of an apparatus for the detection of obstacles according to the present invention which permits in the present case three levels of the observation of obstacles, located respectively in three different planes.

FIG. 1 illustrates three possible levels of observation of a scene by the detection device 1 installed on a vehicle traveling on a road R. In this manner, the apparatus 1 makes it possible by means of a large and/or small scan and from the merging of the video information and the range information, as described hereinbelow, to analyze overall the scene in the plane P3, to detect potentially dangerous obstacles in the plane P2 and to detect the most dangerous obstacles in the plane P1, in latter case actuating range strokes on the obstacle to inform the driver or to act on the safety elements of the vehicle.

Figure 6:
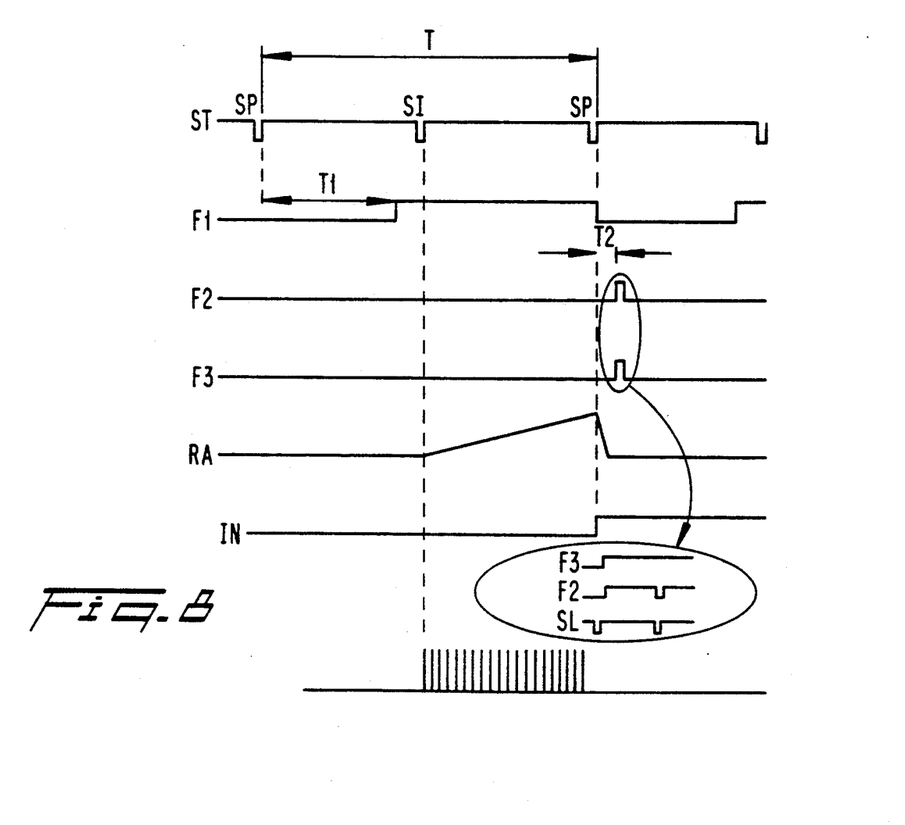
FIG. 6 is a schematic top view representing a decoupling means used with a range device of the apparatus according to the invention.
Figure 7:
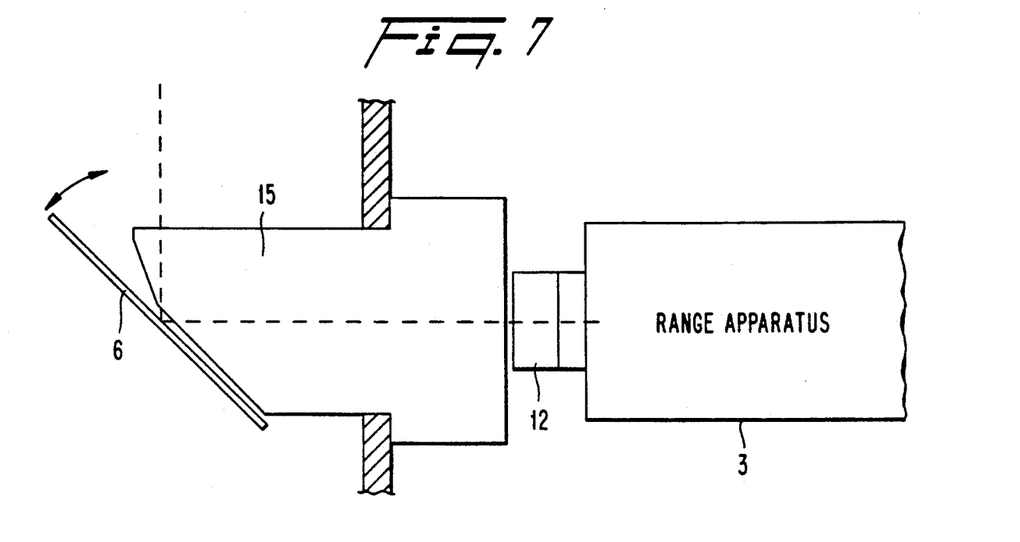
FIG. 7 is a view according to the arrow VII of FIG. 6.

The range apparatus 3 comprises two optical elements 12, 13 through which respectively the emission and reception of the laser beam take place. The optical element 12 is further designed to reduce the center distance between the axes of the emission and reception beams as shown in FIG. 6. The emission and reception of the laser beam requires a minimum diameter of 50 mm of the inlet pupil 14 of the beam deflection assembly. In order not to cause a drop of the intrinsic performance of the range apparatus 3, which would translate in a considerable reduction in range passing from 85 m (range apparatus only) to about 6 m (range apparatus with the deflection apparatus), it is necessary to decouple by means of a cover 15, the emission from the reception to the level of the mirror 6. Without this decoupling cover 15, the reception optics would collect part of the energy of the emission beam, thereby causing poor functioning of the range apparatus 3.

Figure 5:
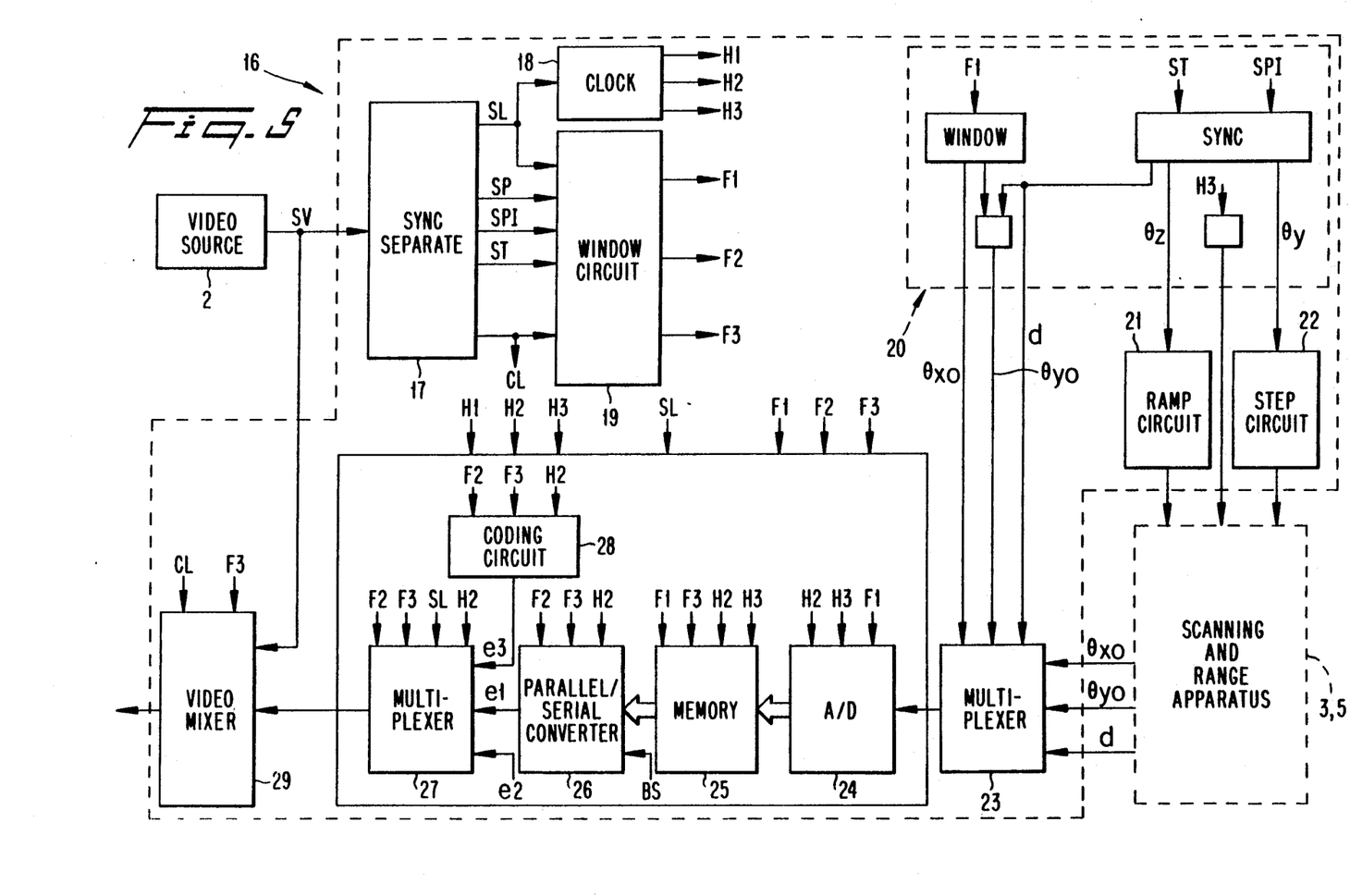
FIG. 5 shows a schematic functional diagram of the signal conditioner used in the apparatus according to the invention.

The circuit 16 of the signal conditioner 4 of FIG. 5 is now discussed in detail.

The circuit 16 comprises a circuit 17 receiving the composite video signal SV of the video camera 2 and making it possible to extract the signal SV from the frequency of the lines SL, a frame synchronization signal ST, a SPI signal identifying an even or uneven field, the signals of the onset of a pair of fields or field pair top signal SP, and the so-called clamping pulses CL, the role of which is explained below. The circuits carrying out the function of the extraction of the synchronization signals from the video signal SV are known per se and, for example, use specialized circuits and a combinatory logic.

The circuit 16 also comprises an electronic circuit 18 receiving the line frequency signal SL and designed to produce a first clock signal H1, for example of a frequency of 1 KHz, to control the rate of the pulsed emission of the laser beam and making it possible to digitalize the range data representing the measured distances of the obstacles and the coordinates in x, y of the impact points of the incident pulsed waves respectively on the obstacles. The circuit 16 also produces a second clock signal H2 used to place into memory the range data and preferably having a frequency double that of the signal H1 and, which, combined with H1, permits the placement into memory of the range data without conflict.

The circuit 16 additionally produces a third clock signal H3, preferably of a frequency of 1 MHz, causing the inscription of the range data on the video image, as explained hereinbelow. The electronic circuit 18 may consist of a phase locked loop (PLL) stage, controlled by the signal SL and a series of dividers. Circuits using a PLL circuit and dividers to produce different clock signals are already known in the field of television and it is not necessary to describe them in detail. Preferably, the emission of the pulsed waves of the laser beam at the frequency of the clock signal H1 is effected during each uneven field of the video image of the camera 2 and the inscription or writing of the range data onto the video image takes place during the following field.

The circuit 16 also contains an electronic circuit 19 to obtain window signals from the signals SL, SP<SPI and ST. The window signals contain a first window signal F1 of a duration of 22 milliseconds actuating the acquisition or recopying of the data relative to the initial positions of the mirrors 6, 7 of vertical and horizontal deflection prior to the scanning of a range line, the horizontal linear scan x, then the emission of the pulsed waves or strokes of the laser and finally the linear implementation IN effected from bottom to top in stages by the vertical deflection mirror 7, of the vertical scan y. The window signals also contain a second window signal F2 of a duration of 512 milliseconds making possible the selection of a certain number of video lines at the onset of each even field upon which the range data are to be written, and a third window signal F3 of a duration of 48 microseconds emitted after the second window signal F2 and validating or authorizing the writing of range data on the video lines selected by the signal F2.

FIG. 8 shows more accurately the positions of the window signals F1, F2 and F3 produced in a synchronized manner by the different synchronization signals received by circuit 19. Thus, the signal F1 is produced just prior to the appearance of the onset of an uneven field SI and terminates at the same time as the uneven field. The onset of the signal F1 is determined by means of an electronic time counter T1 of the circuit 19 and is actuated by the ascending front of the onset signal of an even field SP. It should be understood that the duration of the signal F1 prior to the onset of uneven field is chosen so as to be sufficient for the acquisition and entering into memory of the positions of the mirrors 6, 7 at the beginning of each range line. The signal F2 is produced shortly after the onset of each even field (by means of another time counter T2 of the circuit 19) and the window signal F3 is emitted shortly after the signal F2 with a duration of each pulse of this signal being less (48 $\mu$s) than the duration of a line (64 $\mu$s).

FIG. 8 also shows the emission E the pulsed waves of the laser beam or range strokes during an uneven field of a duration of T/2, or 20 milliseconds, at the frequency of the clock signal H1. Thus, during this uneven field 20 range strokes are carried out, corresponding to 20 points of impact of the laser beam per range line.

Figure 9:
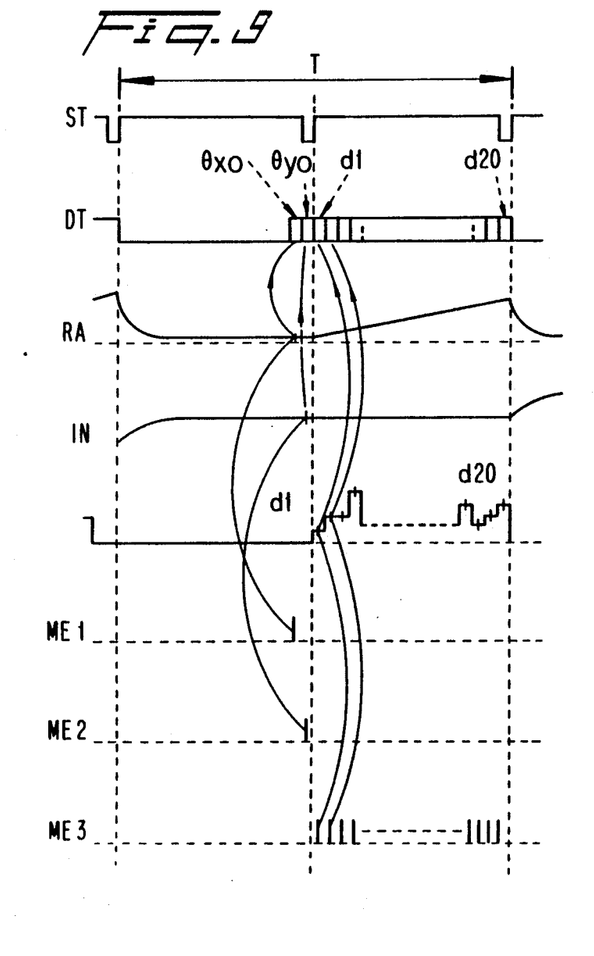
FIG. 9 shows the sampling of the range data by the circuits of the conditioner of FIG. 5.

The circuit 16 further comprises an electronic circuit 20 receiving the clock signal H1, the window signal F1, the frame synchronization signal ST and the even-/uneven field signal SPI and making possible to determine and place into memory the initial positions of the mirrors 6, 7 prior to the scanning of a range line, controlling during each uneven field the mirrors 6, 7 so that the laser beam scans each range line and the range strokes E at the H1 clock frequency. Therefore, at the onset of an uneven field, the circuit 20 issues a command signal to a circuit 21 to form a ramp signal applied to the dotted line block of FIG. 5 and comprising the range apparatus 3 to which the scanning assembly 5 is coupled to cause the pivoting of the mirror 6 so as to scan a horizontal range line with the laser beam. The circuit 20, at the onset of the even field following the aforementioned uneven field, issues a command pulse to the circuit 22 thereby applying to the scanning assembly 5 an incrementation signal IN, thereby pivoting the mirror 7 in the direction indicated by the arrow A in FIG. 2 by an angle of rotation corresponding to an displacement stage toward the top according to the axis of the ordinates of a stage corresponding to the incrementation value. The circuit 20 also issues range stroke signals to the scanning assembly 5 and the range apparatus 3, at the frequency of the H1 clock signal, during each uneven field. The range image of 10 lines at 20 impacts per line is realized as described above, by choosing a linear scanning from left to right for the horizontal deflecting mirror and a linear incrementation of bottom to top in 10 stages for the vertical deflection mirror 7. For reasons related to the response time of the mirrors 6, 7, the latter are actuated at the onset of the even field following the uneven scanning frame $\Theta_x$ so that their initial positions $\Theta_{xO}$ and $\Theta_{yO}$ at the onset of the scanning of each range line can be perfectly stabilized at the end of the even field. FIG. 9 shows at the range data line DT the two initial positions $\Theta_{xO}$ and $\Theta_{yO}$ of the mirrors 6, 7. The telemetric data DT representing the positions of the laser impacts on the target and the distances of the target from the telemetric apparatus 3 are sampled and placed into memory during the window signal PJ, in the following order:

$$\Theta_{xO}, \Theta_{yO}, d_i \text{ with } 1 < i < 20.$$

For this, the values $\Theta_{xO}$, $\Theta_{yO}$ and d, which are analog voltages, are imaging respectively the positions of the mirrors 6, 7 of horizontal and vertical scanning and distances of the target from the range apparatus, are applied to a multiplexer circuit 23 which receives successively from the circuit 20 command signals defined by the window signal F1 so as to provide at its outlet the value of the analog voltage $\Theta_{xO}$, then the value of the analog voltage $\Theta_{yO}$ and finally the analog values of the distances d measured by the range apparatus 3 during uneven fields. The outlet of the multiplexer circuit 23 is connected with the inlet of an analog-digital converter circuit 24, the digital outlet whereof is applied to a memory circuitry 25. In order not to deteriorate the precision of the measurement Δd of the range apparatus 3, which in the present case is 20 cm for a range image located 100 m from the range apparatus, and to take into account the negative values of the telemetric data to be converted into the digital form (the analog voltage values are within the following ranges:

$$-5 < \Theta_{xO} < +5 \text{ volts}, \ 0 < \Theta_{yO} < +2.5 \text{ volts } 0 < d <$$

+10 volts), digitalization is effected on 11 bits.

Only the first value of $\Theta_{xO}$ at the onset of each range line is digitalized by the conversion circuit 24 and placed into memory in the memory circuit 25, as the type of horizontal scanning, in the present case in the form of a ramp, is known and makes possible to reconstitute the 20 positions $\Theta_{xi}$ of the impact points of a line corresponding to 20 range strokes. It should be understood that any other type of horizontal scanning, other than that initiated by a linear or nonlinear command, may be used. Advantageously, the impact points 11 of the pulsed waves of the laser beam are located in a zigzag pattern by the temporary shifting in alternate directions of one range line in two at the start of each horizontal scan. In other words, the ramp curve RA of FIG. 8 and 9 is shifted (retarded) to carry out the strokes in a zigzag pattern.

Figure 10:
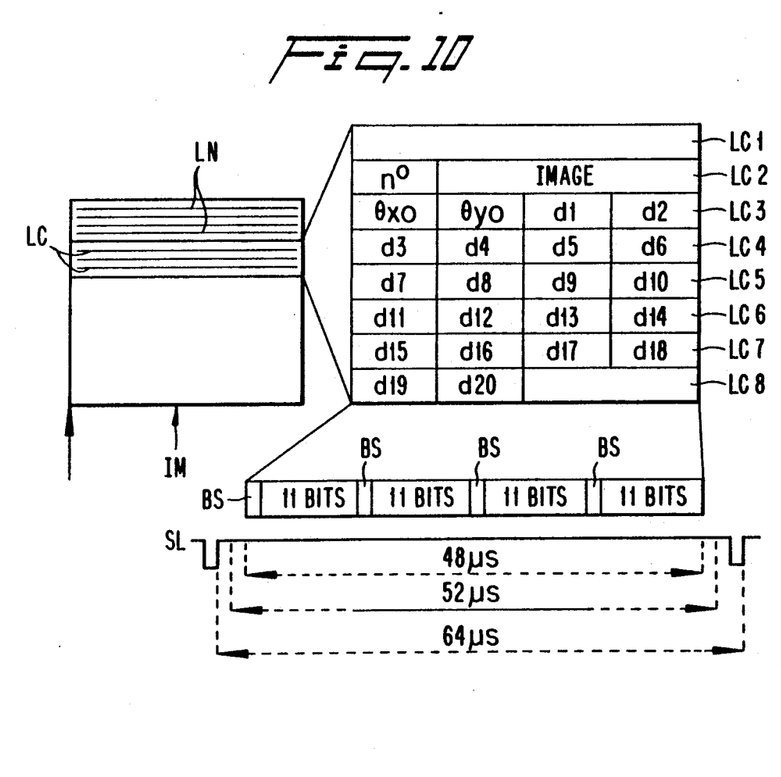
FIG. 10 shows an example of the coding format of the range data.

The memory circuit 25 is connected with a parallel-series converter circuit 26. When the range data in the memory circuit 25 are extracted to be overlaid or written onto the video image as described hereinbelow, each range data of 11 bits is preceded by a starting bit BS applied to the parallel-series converter circuit 26 as shown in FIG. 10.

The writing of words of 12 bits exiting from the converter circuit 26 onto the video image must be carried out at the frequency of the clock signal H3 of 1 MHz, thus over a period of 1 microsecond. As one video line, in keeping with the SECAM standard, has a duration of 64 microseconds, four words of 12 bits (48 microseconds) may be written onto a video line, as may be seen in FIG. 10. To inscribe all of the range data DT, obtained during an uneven field, six consecutive video lines of the even field following said uneven field are necessary (the inscription taking place at the onset of the even field). The range data are inscribed by a simple binary code. For example, the logic level "1" is represented on a video image by a white video and the logic level "0" by a black video. Each logic state has a duration of 1 microsecond and corresponds to 10 image elements or pixels for a digital video image in the 512 ×512 image element format. In other words, to four range data of 12 bits, each of which is written on a video line, 480 image elements of a video line are corresponding.

The converter circuit 26 is connected with an inlet e1 of a multiplexer circuit 27, which receives at another outlet e2 with a logic level "1" corresponding to a white video line serving as general startup. This white video line precedes on the video image line reserved for numbering and for the identification of each video image. Each digitally coded video image number is applied to as third inlet e3 of the multiplexer circuit 27 by an appropriate coding circuit 28. FIG. 10 shows the coding format of the range data on an IM video image. This image comprises in its upper part a certain number of forced LN black lines, followed by 8 coding lines LC representing comprising from top to bottom a forced white line LC1 for general startup, the line LC2 numbering the video image IM and the six lines LC3 to LC8 coding the telemetric data of a telemetric line.

The multiplexed digital range data issuing from the outlet of the circuit 27 constitute a standard video signal (0–0.7 V) and are applied to a video mixer circuit 29 which also receives the video image signal coming from the video camera 2. The window signal F3 making it possible to select at the onset of each even field the video lines or the inscription of the range data, and the so-called clamp signal received by a clamping stage in the mixer circuit 29 for the correct alignment of the video and telemetric signals, are applied to the mixer circuit 29. The outlet of the mixer circuit 29 is connected with a standard recording device, such as a video tape recorder, of the video signals and the range data for the analysis and different processing of these signals. However, the outlet of the mixer circuit 29 may be connected with a computer on board the vehicle for the real time processing of the video and range signals so as to produce in particular signals for the control of the safety devices of the vehicle as a function of the result of the processing of said data.

The circuit 20 consists of modules for the adaptation and formation of the signals, for example based on logic gates, in order to obtain the aforementioned different command signals. Such a circuit is readily designed by those skilled in the art in view of the simple functions assigned to it.

The operation of the apparatus 1 for the detection of obstacles largely results from the description given above and is now summarized with particular reference to FIGS. 8 and 9.

During an even field of a video image, the mirrors 6, 7 are controlled in a manner such that they are placed in a start position of the horizontal scanning of a range line of the scene observed by a video camera 2, said position being represented by the values $\Theta_{xO}$ and $\Theta_{yO}$ and entered into memory in the circuit 25 at the onset of the window signal F1 prior to the start of the following uneven field. The memorization of these data is indicated at ME1 and ME2 in FIG. 9. At the onset of the uneven field, the emission of the pulsed waves or range strokes of the laser beam is initiated at the frequency of the clock signal H1 synchronously with the horizontal scan of the mirror 6 during the uneven field. In the course of said field, the range data relative to the distances d measured by the telemetric apparatus 3 are sampled and entered into the memory 25 as indicated by the line ME3 in FIG. 9. At the start of the following even field, the window signals F2 and F3 are produced so as to make possible the inscription of the range data DT onto the corresponding video lines of the video image selected by the signal of the window F2 and the mirrors 6, 7 are commanded to position themselves so as to scan the following range line and the sampling and memorization of the range data $\Theta_{xO}$, $\Theta_{yO}$ is repeated during the next uneven field. The range data inscribed onto the video images are processed in particular by the computer on board the vehicle, in order to provide information to the driver or to act on the safety devices of the vehicle whenever a potentially dangerous obstacle is detected very near to the advancing vehicle. In this case, it is possible to provide an electronic circuit to actuate range pulses on the dangerous obstacle in order to assure maximum safety in the operation of the vehicle.

The combination of a video camera and a range apparatus coupled with an X-Y deflection device of the radiation of the range apparatus makes it possible to provide, in perfect synchronization in particular by the synchronization signals of the frame and the line of the video signal of the camera, a video image onto which the telemetric data are inscribed for the highly accurate localization of objects distant from the vehicle, in a zone from about 5 to 100 m. The coding and mixing of telemetric information permit the realization of a detection apparatus of a simple structure and operation from an electronic point of view, the recording on any standard video tape recorder of synchronized video image-range image data for different processing, and the utilization in real time of said images by an analysis system on board the vehicle.

We claim:

1. A process for detecting the presence of obstacles, said process comprising the steps of:
   providing, by means of a video camera, a video signal representative of a video image of a scene;
   measuring the distances of the obstacles in the scene relative to the video camera by means of a ranging apparatus, pulsed waves of which scan the scene by successive horizontal range lines; and
   synchronizing the pulsed waves and the scan of the pulsed waves by synchronization signals of the field and the line extracted from the video signal.

2. The process according to claim 1, wherein the pulsed waves are effected during each uneven field of the video image and an inscription of the range data is carried out during the following even field of the image.

3. The process according to claim 1, wherein the pulsed waves are emitted at a determined first clock frequency obtained from the frequency of the line synchronization signal, and further comprising the steps of digitalizing at least the range data relative to measured distances of impact points during the uneven range of the pulsed waves at a sampling frequency equal to the first clock frequency; entering the range data digitalized during the uneven field into memory by a combination of the first clock frequency and a second clock frequency in order to avoid data conflicts; and causing an inscription of the digitalized data during the following even field onto a certain number of consecutive video lines of the even frame at a third clock frequency obtained from the frequency of the line synchronization signal, said third clock frequency being higher than the first and the second clock frequencies.

4. The process according to claim 1, wherein the range data and the data of the video image are processed in real time.

5. The process according to claim 1, wherein the points of impact of the pulsed waves are placed in a zigzag pattern at the temporary shift of one range line, at the onset of each horizontal scan.

6. The process according to claim 1, wherein the range data are digitalized as 11 bits with a supplementary starting bit.

7. The process according to claim 1, wherein the range data and the data of the video image are recorded on a recording device.

8. The process according to claim 7, wherein the recording device is a video tape recorder.

9. The process according to claim 1, wherein the pulsed waves horizontally scan a range line of the scene during an uneven field at a first clock frequency and a beam of the pulsed waves is deflected vertically and horizontally during the following even field to an initial scanning position of a following range line, said scanning being effected during the following uneven field.

10. The process according to claim 9, further comprising the steps of digitalizing and entering into memory, at the end of the even field, the values of the initial scanning position of each scan of a range line; and automatically reconstructing the position of the different impact points of the consecutive pulsed waves from a preestablished scanning curve.

11. The process according to claim 10, wherein the preestablished scanning curve is a ramp curve.

12. The process according to claim 1, further comprising the step of imparting onto the video image, in a synchronized manner, range data produced by the range apparatus, which are representative of the measured distance of the obstacles and coordinates of the points incident pulsed waves impact obstacles.

13. The process according to claim 12, wherein the pulsed waves are effected during each uneven field of the video image and an inscription of the range data is carried out during the following even field of the image.

14. The process according to claim 13, further comprising the steps of producing, at the onset of each even frame, a selection signal signifying the selection of the number of video lines onto which are inscribed the range data and producing, shortly after the selection signal, a second signal to validate the inscription of the range data onto the selected video lines.

15. The process according to claim 14, wherein said video lines upon which the range data are inscribed, are located in the upper part of the video image after several blank lines and comprise, from top to bottom, a general startup line, a line for the identification number of the video image and the lines of the inscription of the range data.

16. An apparatus for the detection of obstacles, said apparatus comprising:
   a video camera for viewing a scene;
   a range apparatus to measure the distance of obstacles in the scene relative to the video camera;
   an assembly for the deflection of a pulsed radiation emitted by the range apparatus, the assembly including at least one mobile deflecting mirror causing the pulsed radiation to effect a horizontal scanning movement of the successive range lines of the scene; and
   a signal conditioner designed to produce, from synchronization signals of an uneven field and a line of a video signal of the video camera, signals making it possible to cause, in the same uneven field, the emission of pulsed radiation and the horizontal scanning movement of the mirror, and signals capable of inscribing during the following even field, onto successive video lines of the video image, range data relative to the coordinates of impact points of the pulsed radiation on obstacles in the scene and relative to the measured distance of each point of impact relative to the video camera.

17. The apparatus according to claim 16, wherein said signal conditioner further comprises a plurality of electronic circuits designed to produce a first signal appearing prior to the start of an uneven field, and ending within the uneven field to define a window authorizing the acquisition of data relative to the initial positions of the horizontal and vertical deflection mirrors prior to the scanning of a range line, the horizontal scan, the emission of pulsed radiation and the incrementation of the vertical scanning mirror to a following range line, a second signal emitted after the start of each even field and making possible the selection of the number of video lines onto which the range data are inscribed, and a third signal emitted after the appearance of the second signal to validate the inscription of the range data onto each line selected.

18. The apparatus according to claim 16, wherein said signal conditioner further comprises a clamping stage permitting the production of clamping pulses for the correct alignment of the video and range signals.

19. The apparatus according to claim 16, further comprising a decoupling means for separating the emission and reception of the pulsed radiation to said at least one deflection mirror.

20. The apparatus according to claim 16, wherein said range apparatus includes a laser.

21. The apparatus according to claim 16, further comprising a computer utilizing the range and video data and generating signals to actuate safety devices of a vehicle.

22. The apparatus according to claim 16, further comprising two mobile mirrors for the horizontal and vertical deflection of the pulsed radiation, said mirrors being controlled during each even frame following an uneven field of horizontal scanning, so as to be returned to an initial position for the onset of a new range line.

23. The apparatus according to claim 22, wherein said signal conditioner comprises circuits and combinatory logic for extracting from the video signal from the video camera, field and line synchronization signals, and for determining the start and end of a field in order to cause at the start of an even field of the video image the displacement of the horizontal and vertical deflection mirrors into the position of the onset of scanning and, at the start of the following uneven field of the video image, the displacement of the mirror to carry out the scanning of a new range line.

* * * * *